Dec. 15, 1925.  
D. H. MOSS  
1,566,162  
METHOD OF MAKING SUPPORTS FOR SOUND REPRODUCERS  
Original Filed Feb. 9, 1924      4 Sheets-Sheet 1
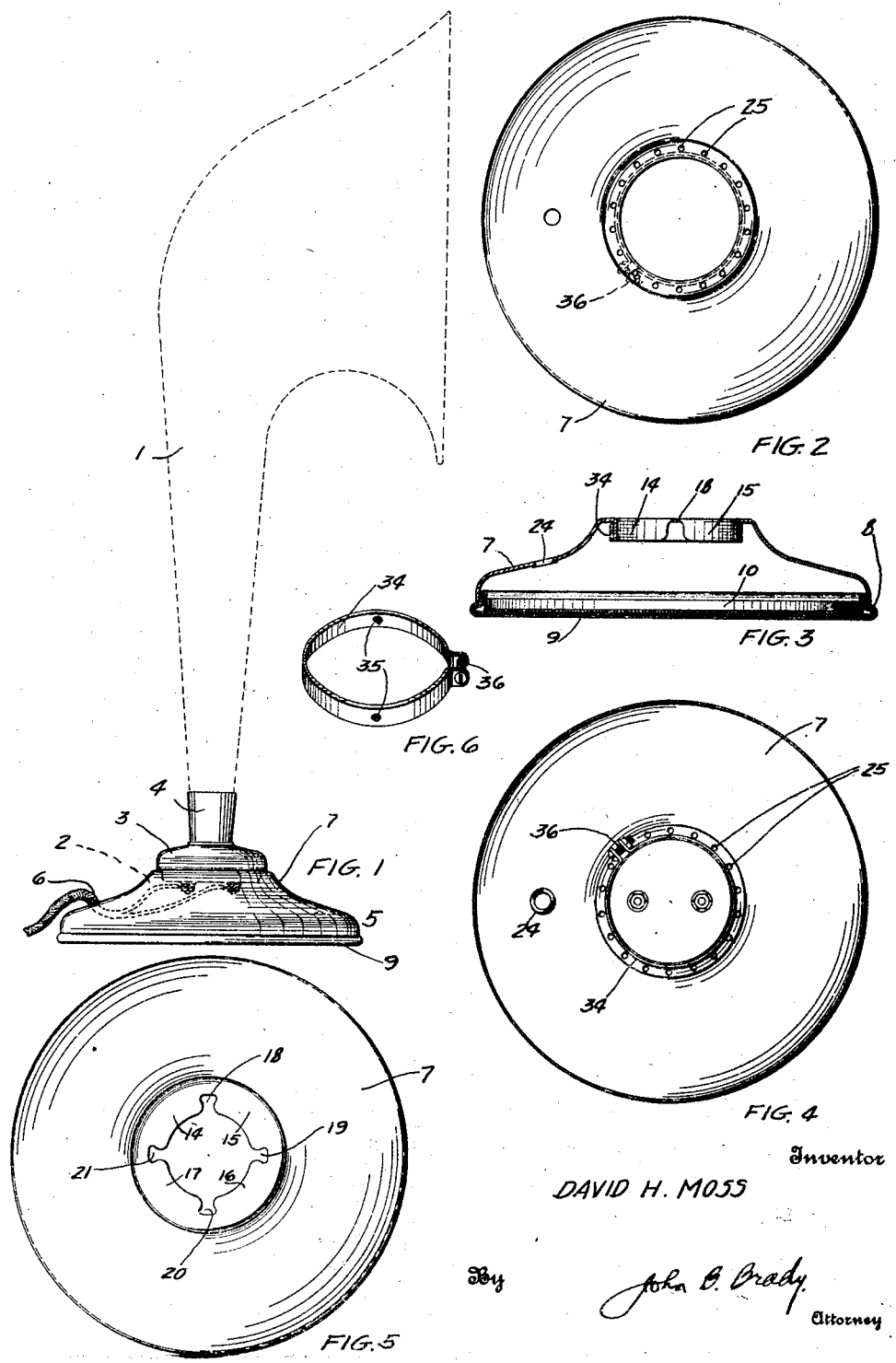
DAVID H. MOSS *Inventor*
By *John B. Brady* Attorney Dec. 15, 1925.
D. H. MOSS
1,566,162

METHOD OF MAKING SUPPORTS FOR SOUND REPRODUCERS

Original Filed Feb. 9, 1924    4 Sheets-Sheet 2

Inventor
DAVID H. MOSS

By John B. Brady
Attorney

Dec. 15, 1925.   1,566,162
D. H. MOSS
METHOD OF MAKING SUPPORTS FOR SOUND REPRODUCERS
Original Filed Feb. 9, 1924   4 Sheets-Sheet 3

Inventor
DAVID H. MOSS
By John B. Brady
Attorney

Patented Dec. 15, 1925.

1,566,162

UNITED STATES PATENT OFFICE.

DAVID H. MOSS, OF NEWARK, NEW JERSEY, ASSIGNOR, BY MESNE ASSIGNMENTS, TO BRANDES LABORATORIES, INC., OF NEWARK, NEW JERSEY, A CORPORATION OF NEW JERSEY.

METHOD OF MAKING SUPPORTS FOR SOUND REPRODUCERS.

Original application filed February 9, 1924, Serial No. 691,812. Divided and this application filed March 4, 1925. Serial No. 13,009.

*To all whom it may concern:*

Be it known that I, DAVID H. MOSS, a citizen of the United States, residing at Newark, in the county of Essex and State of New Jersey, have invented a certain new and useful Improvement in a Method of Making Supports for Sound Reproducers, of which the following is a specification.

My invention relates broadly to electromagnetic sound reproducers, and more particularly to the construction of a support and an assembly for such electromagnetic sound reproducers, and the method of making such support and assembly.

This application is a division of my copending application, Serial Number 691,812, filed February 9, 1924.

One of the objects of my invention is to provide a support for an electromagnetic sound reproducer which is capable of relatively inexpensive manufacture on a quantity production basis by a series of steps which I have perfected.

Another object of my invention is to provide an arrangement of parts for electromagnetic sound reproducers which may be readily assembled by relatively unskilled labor for manufacturing sound reproducers on a large production scale.

Still another object of my invention is to provide a construction of base support for an electromagnetic sound reproducer having its several parts pressed from sheet metal in a succession of operations for developing and assembling the complete instrument from raw material within a relatively brief interval of time with a high degree of manufacturing efficiency.

Figure 7:
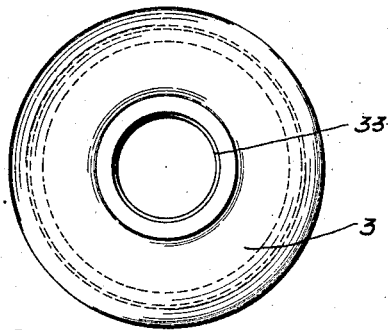
Figure 8:
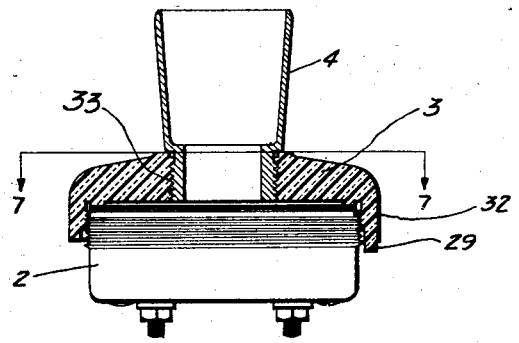
Figure 9:
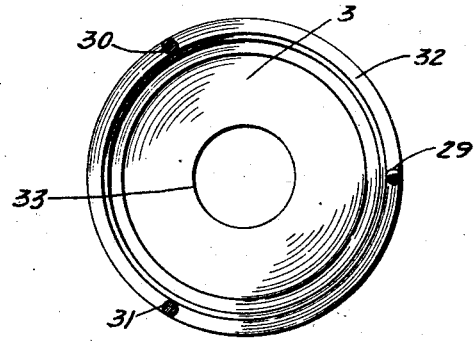
Figure 10:
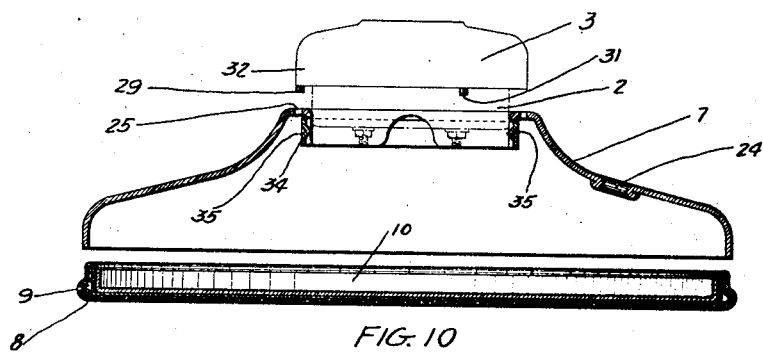
Figure 10A:
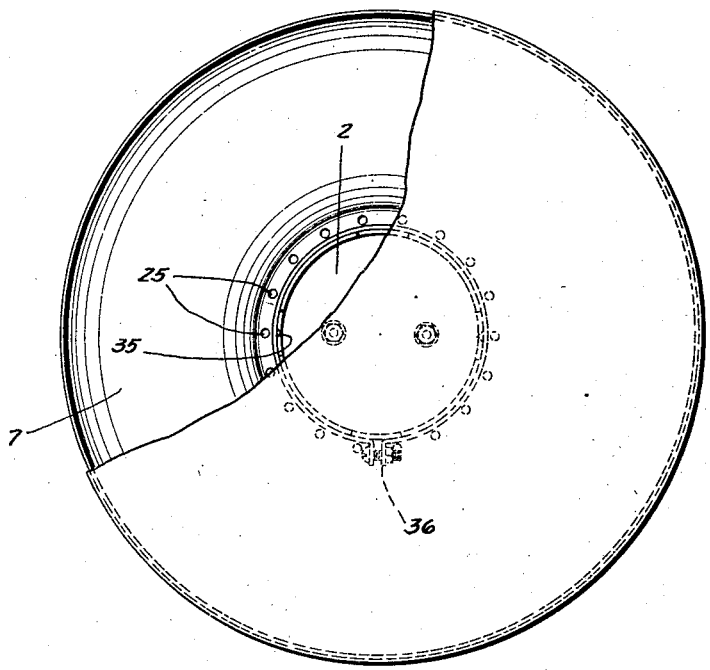

Other and further objects of my invention will be pointed out in the specification hereinafter following by reference to the accompanying drawings, in which:

Figure 1 is an assembly view of the completed electromagnetic sound reproducer or table talker showing the assembly of the support of my invention; Fig. 2 is a plan view looking down upon the supporting base; Fig. 3 is a cross sectional view of the assembled base construction with the electromagnetic sound reproducer casing removed therefrom; Fig. 4 is a plan view looking upwardly below the base with the lower supporting member removed; Fig. 5 illustrates the top of the base member before the lip portions which form the gripping collar of the base about the side wall of the electromagnetic sound reproducer casing have been turned downwardly; Fig. 6 is a perspective view of the gripping collar which is employed to draw the lips of the supporting flange of the base against the side walls of the electromagnetic sound reproducer; Figs. 7, 8 and 9 are views of the cap which I employ for locking the electromagnetic sound reproducer in fixed position with relation to the base; Fig. 10 is a view illustrating the assembly process of the complete parts of the support; Fig. 10$^a$ is a view looking from beneath the assembled base partially broken away to show the interior of the support; and Figs. 11, 12, 12$^a$, 13, 14, 15, 16, 17, 18, 19 and 20 show the successive steps which I provide for manufacturing the supporting base from flat sheet material to the finished product through a series of pressing and cutting operations.

Heretofore in the art electromagnetic sound reproducers used in connection with radio receiving apparatus have been relatively expensive in construction, due, among other things, to the failure of manufacturers to discover methods of manufacturing the parts of the reproducer associated with the electromagnetic mechanism in a systematic order, with parts so related that they might be readily assembled in producing the complete instruments. I have developed a construction of support for an electromagnetic sound reproducer which may be produced by a succession of cutting and pressing operations with a molded cap member for the casing of the electromagnetic sound reproducer arranged for assembly with the pressed parts to produce an inexpensive and effective instrument. One of the problems solved by my construction is the unitary assembly of the base and electromagnetic sound reproducer casing by means of molded projections on the cap which cooperate with apertures in the top base member to prevent relative rotation of the electromagnetic sound reproducer casing and the base. Still another feature of my invention is the method by which I cover the lower base member with felt or cloth and at the same time secure necessary weight in the base of the instrument to position the center of gravity very near the supporting surface. I accomplish this by a disk member having an upturned annular flange which fits snugly within the interior of the lower base member drawing the felt or cloth over the bottom and sides of the lower base member.

Another feature of the invention is the provision of depending lips or tongues on the top base member which may be drawn together by an annular collar to frictionally grip the walls of the electromagnetic sound reproducer casing, preventing the vertical withdrawal of the electromagnetic sound reproducer from the base at the same time that the aforementioned projecting tongues on the cap preclude relative rotation of the cap and base.

Referring more particularly to the drawings, the assembled table talker is shown in Fig. 1 comprising an acoustic horn, a casing 2 for the electromagnetic sound reproducing mechanism, a cap 3 on the casing in which is secured a ferrule 4 and the entire assembly supported in a base 5. The conductors leading to the electromagnetic operating mechanism pass into the base 5 through cable 6. The supporting base 5 comprises a plurality of parts including a top portion 7 and a lower base portion 8. The base portion 8 and the top supporting base 7 are assembled, as more clearly shown in Fig. 3, wherein a layer of felt or other cloth 9 is rigidly drawn over the bottom and sides of the base 9 by means of a disk insert 10 which is pressed into the interior of the base portion 8. The felt 9 on the exterior walls of the base portion 10 serves to frictionally bind the base portion 7 and 8 together when the portion 8 is forced into the portion 7.

Figure 11:
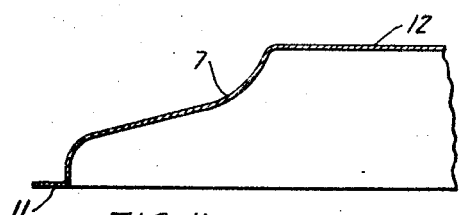
Figure 16:
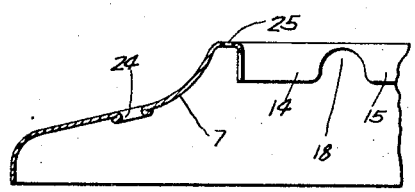
Figure 12:
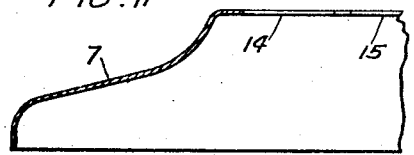
Figure 13:
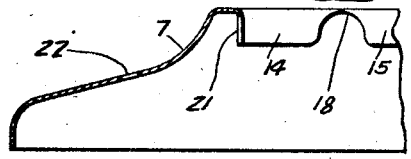
Figure 14:
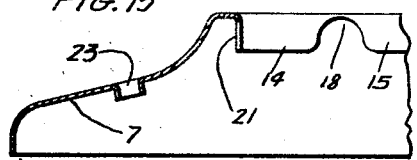
Figure 15:
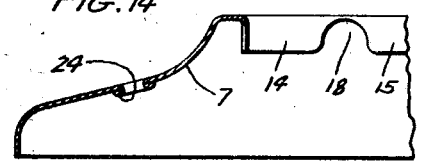

As represented in Fig. 11 the base portion 7 is initially die pressed to the shape shown. The excess material of the flange 11 and the central material 12 in the interior of the base portion 7 is cut off and punched out in an operation resulting in the product illustrated in Fig. 12. The removal of the material in the center of 12 leaves a plurality of tongues 14, 15, 16 and 17 protruding toward the center of the base portion 7 as illustrated more clearly in Fig. 12ª, and Fig. 5. The tongues are spaced apart by slots 18, 19, 20 and 21. In the operation illustrated in Fig. 13, I press the tongues 14, 15, 16 and 17 downwardly and at the same time an aperture 22 may be punched into base 7 to permit passage of the conductor 6 therethrough. In the operation illustrated in Fig. 14 the aperture 22 for the conductors is drawn inwardly, providing round smooth edges 23 to facilitate the passage of the conductors into the base. In Fig. 15 I show the operation by which the sharp edges of the conductor entrance are rolled over and smoothed off, as illustrated at 24. The final operation on the base portion 7 is illustrated in Fig. 16 wherein a series of apertures 25 are punched in an annular ring about the flattened top of the base 7. These apertures are more clearly illustrated in plan view in Figs. 2, 4 and 10ª.

Figure 17:
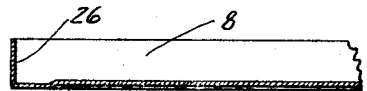
Figure 12A:
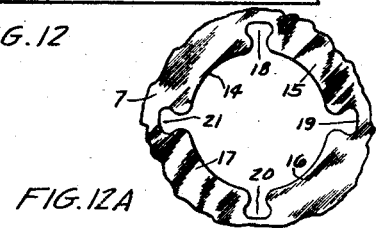
Figure 18:
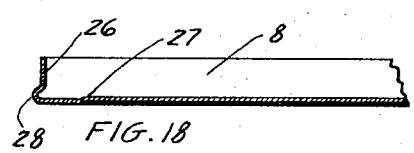

As shown in Fig. 17, the lower base member 8 is formed from flat sheet material by a pressing operation which provides an annular upstanding skirt connected with a horizontal circular bottom plate depressed from the plane of the bottom member 8 as indicated at 27. The skirt 26 is then upset forming a shoulder 28 adjacent the plane of the bottom base member 8 as represented in Fig. 18 completing the stamping and pressing operations upon this lower base member.

Figure 19:
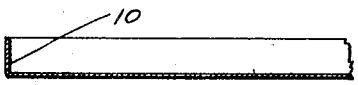
Figure 20:
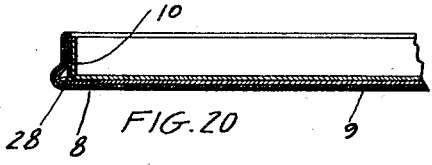

The insert member represented by reference character 10 is cut and pressed from sheet metal to the shape represented in Fig. 19. The several parts are assembled together as represented in Fig. 20 wherein the circular felt sheet 9 is stretched over the lower base member by the telescopically fitting insert 10 within the lower base member 8.

It will be understood that after the completion of the cutting and pressing operations upon the base members that the material is subjected to heat treatment for ornamenting and beautifying the exterior surface appearance.

As represented more clearly in Figs. 7, 8, 9 and 10, the electromagnetic sound reproducing mechanism within the casing is provided with a molded cap 3 having depending projections 29, 30 and 31. The projections are spaced at intervals about the periphery of the lower edge of the skirt 32 of the cap 3 in proportion to the distances between the apertures 25 and the upper base member 27. When the instrument is to be assembled, these projections 29, 30 and 31 enter corresponding apertures 25 and lock the electromagnetic mechanism against rotation with respect to the base. The cap 3 is thickened at its central portion 33 and threaded to receive the ferrule 4 serving as a seat and support for the acoustic horn 1. When the assembled table talker is inserted vertically downwardly into the supporting base and the projections 29, 30 and 31 passed into apertures 25 locking the instrument with respect to the base, I clasp the casing 2 by frictional engagement with the depending lips, 14, 15, 16 and 17 by means of a collar band 34 shown more clearly in Fig. 6. The band 34 is provided with a pair of interiorly directed projections 35 tending to bite into the casing 2 between a pair of the diametrically opposed slots 18, 19, 20 and 21. The collar 34 is drawn tightly against depending lips 14, 15, 16 and 17 by means of screw member 36. After the table talker has been firmly anchored against removal from the base member 7, the lower base member 8 is telescopically inserted within the upper base member 7 as heretofore described. The completed instrument is substantially sealed against tampering and requires no adjusting after passing a final and rigid factory inspection.

The metallic insert 10 serves not only as a means for stretching the felt 9 over the lower base member 8, but also as a weight to lower the center of gravity of the table talker. By this arrangement of telescopic members I avoid the necessity of gluing the felt to the base and secure a much more uniform product by reason of the tight stretching of the felt over the shoulder 28 which adds to the esthetic qualities of the instrument.

The construction of the support as hereinbefore described and the method of manufacturing the same has been found to be one of the practical embodiments of the invention, but it is to be understood that modifications may be made and that I intend no limitations upon the invention other than are imposed by the scope of the appended claims.

What I claim and desire to secure by Letters Patent of the United States is as follows:

1. The method of manufacturing a support for an electromagnetic sound reproducer which consists in stamping an upper base member to substantially the contour of a finished base with a substantially flat central portion, punching out said central portion in a shape to provide a plurality of inwardly extending lips, pressing said lips vertically downward and simultaneously providing an entrance for a conductor into said base, enlarging said entrance and smoothing down the side walls thereof, and providing a plurality of apertures in the top of said base member for cooperation with a plurality of projections depending from a cap secured to the casing of an electromagnetic operating mechanism.

2. The method of manufacturing a supporting base for an electromagnetic sound reproducing mechanism which consists in pressing an upper base member to substantially the shape of a finished base with a substantially flat central portion, removing a portion of the material in said substantially flat portion for providing a plurality of inwardly extending lips, pressing said lips vertically downward, providing a lower base member with an annular skirt, upsetting a portion of the skirt, and providing a disk insert member having an upwardly projecting annular skirt, the diameters of each of said members decreasing to enable said members to be mutually telescoped.

3. The method of manufacturing a support for an electromagnetic sound reproducer which consists in die pressing to shape an upper base member, cutting off the excess at the periphery thereof and simultaneously punching out the center thereof to form inwardly extending tongues, bending said tongues to provide a central seat for an electromagnetic sound reproducer and closing the base of said upper base member.

4. The method of manufacturing a support for an electromagnetic sound reproducer which consists in die pressing a flat sheet of material to a circular shape having a relatively small diameter at its top and a relatively large diameter at its base, cutting off excess material at the base, punching out material at the top in the form of inwardly extending tongues pressing said tongues downwardly for forming a supporting surface and closing the base.

5. The method of manufacturing a support for an electromagnetic sound reproducer which consists in die pressing a flat sheet of material to a circular shape having a relatively small diameter at its top and a relatively large diameter at its base providing said base with a telescoping edge, stamping out a bottom closure member adapted to telescope within said telescoping edge and closing said base and providing downwardly extending tongues from said top for frictionally engaging the walls of an electromagnetic sound reproducer.

6. The method of manufacturing a support for an electromagnetic sound reproducer which consists in pressing a flat sheet of material substantially in the form of an inverted cup with a flat central portion at its top connected by an outwardly flaring base, punching out said flat central portion to provide inwardly extending tongues, bending said tongues downwardly for binding an electromagnetic sound reproducer in said base and closing said base with a flat circular sheet of material.

7. The method of manufacturing a support for an electromagnetic sound reproducer which consists in pressing a flat sheet of material substantially in the form of an inverted cup with a flat central portion at its top connected by an outwardly flaring base, punching out said flat central portion to provide inwardly extending tongues, and a flat peripheral ledge, piercing said ledge with apertures, pressing said tongues downwardly for forming a seat in said top for an electromagnetic sound reproducer and closing said base by a flat circular sheet of material.

DAVID H. MOSS.